Figure 1:
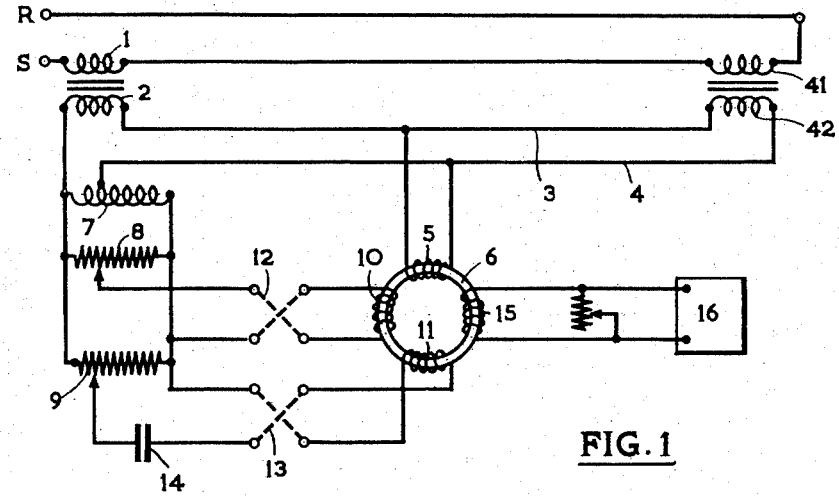

Aug. 28, 1951     H. S. PETCH     2,566,140
APPARATUS FOR COMPARING ALTERNATING CURRENTS
Filed Feb. 25, 1948

INVENTOR.
HERBERT STANLEY PETCH
BY
*Mock & Blum*
ATTORNEYS

Patented Aug. 28, 1951

2,566,140

UNITED STATES PATENT OFFICE 2,566,140

APPARATUS FOR COMPARING ALTERNATING CURRENTS

Herbert Stanley Petch, Edgware, England, assignor to Elliott Bros. (London) Limited, London, England, a company of Great Britain Application February 25, 1948, Serial No. 10,733
In Great Britain March 31, 1939

Section 1, Public Law 690, August 8, 1946
Patent expires March 31, 1959

9 Claims. (Cl. 175—183)

This invention concerns improvements in or relating to a method of and apparatus for comparing alternating currents, and has for its object to provide a method which is accurate and easily carried out, and an apparatus which is simple to operate.

A method of testing current transformers by comparison with a standard transformer has previously been proposed in which the primary windings of the transformers are connected in series with a source of power, and the secondary windings are also connected in series, in such a manner that the voltages induced in said secondary windings are in phase. The potential difference across the secondary of the test transformer, which would be zero if there were match, is applied to a winding of a magnetic coupling device so that a voltage drop is induced in another winding thereof. Two regulable voltage drops are induced in this other winding, one of which regulable voltage drops is substantially in phase with the primary voltage and the other of which is displaced 90° in phase relatively thereto.

In the above method of testing current transformers a magnetic flux is always present in the core of the magnetic coupling device throughout the measurement so that an inductive load is always imposed on the transformer under test by the spill circuit. The present invention has for an object to eliminate as far as possible this inductive burden so that the total burden is reduced to a minimum, and is purely resistive, whilst retaining the advantages of sensitivity and flexibility of the circuit arrangement referred-to.

According to one embodiment of the invention, a method of simultaneously comparing two alternating currents of the same frequency in respect of their magnitudes and their phase relationships consists in connecting the sources of the currents to be compared in series, applying the potential difference developed across the series circuit to a first or spill winding on a magnetic coupling device, whereby a magnetic flux is produced by said winding in the core of the said coupling device, supplying to another or neutralising winding of the coupling device another current of the same frequency as the currents to be compared, varying said other current until the flux in the magnetic coupling device is reduced to zero, and measuring or indicating the magnitude and phase of said other current. The current in the other or neutralising winding may be derived from one of the sources which are connected in series, and preferably comprises two currents each supplied to a separate winding of the magnetic coupling device, one such current being in phase with one of the currents or voltages to be compared and the other in quadrature with it.

In particular, the invention provides a method of comparing the characteristics of two transformers wherein the primary windings are connected to a common supply, and the two secondary winding constitute the sources of the currents to be compared.

The invention also provides apparatus for simultaneously comparing two alternating currents in respect of their magnitudes and phase relationships comprising a first or spill winding adapted to be connected across the circuit connecting in series the sources of the currents to be compared, a second winding or windings adapted to be connected to means for supplying a current of the same frequency as the currents to be compared, means for controlling and for indicating or measuring the magnitude and phase of said current, means for magnetically coupling all the said windings, and means for indicating the presence or absence of magnetic flux in said coupling means.

The means for indicating the presence or absence of magnetic flux in the coupling means conveniently comprises an additional winding associated with the coupling means, and means to indicate a current in said additional winding, and the magnetic coupling means may comprise a core of magnetic material, for example of ring form.

Figure 2:
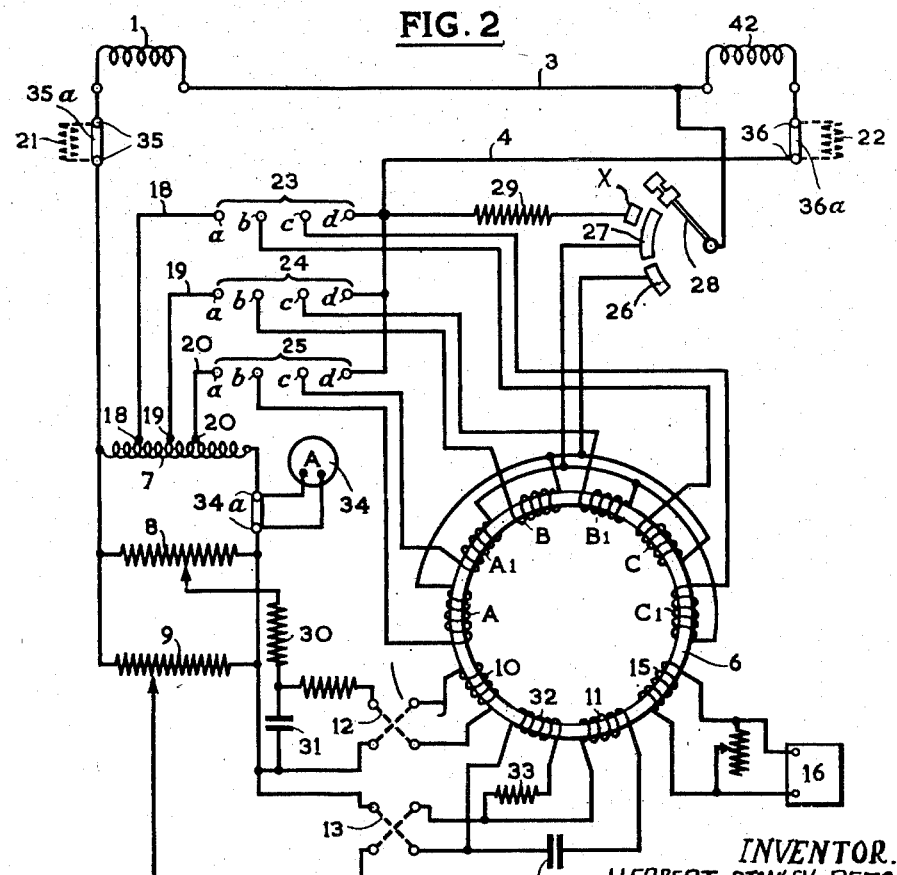

In order that the invention may be more clearly understood, it will be described by way of example with reference to the accompanying drawings wherein:

Fig. 1 is a circuit diagram of a simple form of apparatus according to the invention, and Fig. 2 is a circuit diagram of an alternate form of apparatus.

Referring to Fig. 1 the particular form of apparatus illustrated is intended for use in determining the ratio and phase angle errors of current transformers, by comparison with a current transformer having known errors, which standard transformer should have the same ratio and secondary current rating as the transformer to be tested. The primary winding 1 of a standard current transformer and the primary winding 41 of a transformer to be tested, are connected in series with a common supply, R, S. The secondary windings, 2, 42 respectively of the said transformers are connected in series with the primary of auto transformer 7. In the illustrated simple form of the circuit in Fig. 1, tappings from the connecting leads 3, 4 between the ends of the secondary windings are taken to a coil 5 (referred to herein as the "spill" winding) wound on a ring 6 of high-permeability magnetic material. Windings 2 and 42 are connected so that the currents produced by the respective voltage drops across windings 2 and 42 are added in the primary of transformer 7 and are opposed in winding 5.

Auxiliary transformer 7 is shown as a so-called auto-transformer, that is to say a transformer in which the primary winding forms part of the secondary winding instead of being separated therefrom. Two potentiometer-connected resistances 8, 9, hereinafter referred to simply as potentiometers, are connected in parallel across the ends of the auxiliary transformer 7. A neutralising winding 10 on the ring 6 is connected through a reversing switch 12 directly to one of the end terminals of auto-transformer 7 and the adjustable tapping of the potentiometer 8, and a second neutralising winding 11 on the ring 6 has one terminal connected through a reversing switch 13 to the same end terminal of the auto-transformer 7. The other terminal of said winding 11 is connected through said switch 13 and condenser 14 to the adjustable tapping of the other potentiometer 9. Thus the current in the winding 10 will be substantially in phase with the current flowing in the secondary winding 2 of the standard transformer, whilst that in the winding 11 will be in leading quadrature therewith. The actual value of condenser 14 is chosen to be such that at the frequency for which the apparatus is designed, its impedance is so related to the other impedances in the neutralising circuit that the quadrature potentiometer scale is made correct. A fourth winding 15 on the ring 6 is connected to an indicating instrument 16 such as a vibration galvanometer. Since the load of the auxiliary transformer 7 with its associated secondary load has to be supplied by the standard transformer 1, 2, the known errors of the standard transformer mentioned herein above should be the errors when supplying such a load.

The apparatus functions as follows:

Since the voltages in the secondary windings 2, 42 of the two transformers act in the same direction around the connecting network, a current will circuliate therein of a magnitude determined by the magnitude of the said voltages and the impedance of the circuit. So long as the two secondary voltages are identical in magnitude and phase, there will be no potential difference developed across spill winding 5 and no flux will be set up in the ring 6. If, however, there is a difference between the errors of the transformer 41, 42 and those of the standard transformer 1, 2, there will be a voltage developed across the spill winding 5 which will be equal to the vector difference between the voltages in the secondaries 2, 42 of the two transformers, and a current will flow in the spill winding 5. Thus a flux will be established in the ring 6 which is proportional to the relative errors of the transformer being tested, either of magnitude of phase or both, and the galvanometer 16 will show a deflection. It will be understood that in the circuit arrangement just described, each transformer 1, 2 and 41, 42 may be looked upon as feeding a current into the spill winding 5, the two currents flowing in opposite directions therethrough and producing opposed magnetic fluxes in the core 6 of the coupling device.

If now a current is passed through, say, the in-phase neutralising winding 10 in such a direction as to set up a flux which opposes the main flux due to the current in the spill winding 5, the galvanometer 16 deflection will be reduced to a minimum when that value of flux is reached which exactly balances the component of the main flux due to the in-phase, or magnitude, error of the transformer 41, 42. The current in the quadrature neutralising winding 11 can now be adjusted until the quadrature component of the main flux is neutralised. This condition is indicated by the reduction of the galvanometer 16 deflection to zero. The actual error of the transformer 41, 42 being tested can thus be calculated from a knowledge of the values of current required in the in-phase winding 10 and the quadrature winding 11 to neutralise the main flux. The values may be measured by suitable instruments in circuit with each winding, or preferably, the slides of the potentiometers 8 and 9 can be calibrated to read directly the in-phase and quadrature errors.

Reference will now be made to Fig. 2 which shows a more elaborate form of apparatus for testing any of the usual types of current transformers. Since these are generally designed with secondary current ratings of either 5 amps., 1 amp., or 0.5 amp., the auxiliary transformer 7 which is shown auto-connected, i. e. as an auto-transformer as in Fig. 1, is provided with input tappings 18, 19, 20 to suit each of the three ratings. The potentiometer circuit may thus be operated at substantially the same voltage irrespective of the rating of the transformer 41, 42 being tested. In order that a single calibration of each potentiometer slide can be used, it is necessary to arrange that any given value of percentage error in the transformer being tested shall give rise to a fixed value of magnetomotive force in the ring 6. Since however, a given value of current flowing in the spill winding represents a different percentage of each of the three secondary current ratings, the spill winding is also divided into three sections, each section being again subdivided into a pair of windings A, A¹, B, B¹, and C, C¹ respectively of unequal numbers of turns, the numbers of turns in the corresponding members A, B, C, or A¹, B¹, C¹, respectively of each pair being in the inverse ratios of the secondary current ratings. If the errors in the transformer 41, 42 under test are beyond the normal range of calibration, the current in the spill winding will be large, and in order to keep the magnetomotive force acting on the ring 6 from the spill winding within the range which can be neutralised by the neutralising windings, either member of a pair of spill windings may be connected to the tappings from the secondary circuit.

The member with fewer turns will be connected in circuit when the errors in the transformer under test are comparatively large, and the member with the greater number of turns will be connected in circuit when the said errors are comparatively small, a range selector contact 28 being provided for this purpose and arranged to co-operate with fixed selector contacts 26, 27 and an auxiliary contact X to which reference will be made later. This arrangement allows errors beyond the range of the direct scale calibrations of the potentiometers to be measured by affording a multiplying factor for the scale readings.

In order to guard against damage to the galvanometer 16 due to wrong connection of the transformer secondaries 2 and 42, allow resistance safety shunt 29 is connected between the tapping of connection 4 and contact element X. Accordingly when contact element 28 is moved over the fixed contact elements, it will first make contact with element X, thus completing the shunt circuit between leads 3 and 4 through low-value resistance element 29; then, while still maintaining this connection, permit spill windings $A^1$, $B^1$ or $C^1$ according to the position of selector switch 23, 24, 25, to be energised in parallel with the shunt 29; then the shunt connection will be open thus allowing spill winding $A^1$, $B^1$ or $C^1$ to be energised by the full voltage drop between leads 3 and 4; while finally, in the last position of the switch, windings A, B and C take the place of the windings $A^1$, $B^1$ and $C^1$. The value of this shunt 29 is preferably so chosen that, in the event of a wrong connection, the galvanometer 16 is protected against damage but gives a substantial deflection, whereas when the connection is correct, the deflection is practically nil. An alternative method of protecting the galvanometer 16 is to arrange that the range selector switch, in its first position, connects a low resistance shunt across the galvanometer winding.

One side of the potentiometer 8 is connected to one arm of the "in-phase" reversing switch 12, the fixed contacts of which are connected to the neutralising winding 10. The sliding contact of the potentiometer 8 is connected to the other arm of the "in-phase" reversing switch 12 and a resistance 30 of suitable value may be inserted in this connection if required. Due to the inductance of the auxiliary transformer 7, there may be a phase difference of more than negligible amount between the current in the standard transformer 1 and the current supplied by the "in-phase" potentiometer 8. Correction may be made for this difference by connecting a condenser 31 across the output terminals of the potentiometer 8.

One side of the potentiometer 9 is connected to one arm of the "quadrature" reversing switch 13 and the sliding contact of the potentiometer 9 is connected to the other arm of the said "quadrature" reversing switch 13. The fixed contacts of this switch are connected to a quadrature neutralising winding 11 through a fixed condenser 14. In order to compensate for any departure from pure quadrature in the condenser 14, a compensating winding 32 wound in reverse sense on the ring 6, may be connected in parallel with the condenser 14 and its winding 11 through a resistance 33.

If desired, the quadrature neutralising winding 11 may be supplied through an inductance instead of a condenser, suitable modifications being then made in the compensating circuit.

In order to check the load conditions in the secondary circuits of the transformers, an ammeter 34 (which may be rectifier-operated) may be connected in series with the output of the auxiliary transformer 7, and since this output is substantially constant for any of the three secondary current ratings mentioned above, the ammeter may be scaled to read percentages of full load. Thus the same instrument can be used for all ranges of secondary current. In order to reduce the load of the neutralising winding circuit on the transformer secondaries 1, 2, this ammeter may be short circuited, for example, by a link 34a, after the necessary check has been made.

Provision may also be made for inserting any desired load in the secondaries of either transformer. Thus pairs of terminals 35, 36 may be mounted on the apparatus, one pair in series with each secondary winding, and to each pair may be connected any desired load 21, 22 respectively. Provision is made for short-circuiting these terminals if desired, for example, by links 35a, 36a.

The requisite circuit through the instrument according to the secondary current rating of the transformer 42 is completed by a link or knife selector switch which connects together the four terminals a, b, c, d of any one of three sets, 23, 24, 25. The terminal a in each set is connected to one of the tappings 18, 19, 20 on the auxiliary transformer 7 corresponding to a particular rating of secondary current. The terminals b in each set are respectively connected to the windings A, B and C, and the terminals c in each set are respectively connected to the windings $A^1$, $B^1$ and $C^1$, all of which windings represent the spill winding on the ring 6. The other ends of the windings A, B, C, and $A^1$, $B^1$, $C^1$ respectively are connected together, and the two common points thus made are respectively connected to the contacts 26 and 27 of the range selector switch 26, 27, 28. The remaining terminals d of each set 23, 24, 25 are connected together and to connection 4 and to one end of the safety shunt 29.

It will be noted that at balance, when there is no flux in the ring 6, the impedance of the spill winding is purely resistive, and since the resistance can be kept very low, the apparatus imposes practically no load on the source of either of the currents to be compared. The auxiliary transformer 7 and potentiometer circuit can be made to impose only a very small load on the supply to which it is connected.

The arrangement is substantially unaffected by stray magnetic fields, and can thus be used in proximity to current-carrying systems without the necessity of special screening. Moreover the apparatus can be made entirely self-contained and independent of any external constant or standard supply. The apparatus may be arranged to read directly in percentage errors for a particular range.

Since the indicating means is transformer-coupled to the testing circuit, its impedance can be matched to that of the said circuit and it has been found in practice that a high degree of sensitivity can be obtained if quite a small portable galvanometer is used, whereas it has hitherto been necessary to use large and delicate apparatus to achieve a comparable result.

The use of an auxiliary transformer, which may be autoconnected, in the circuit of the standard transformer secondary for supplying the potentiometer circuit has the advantage of enabling the voltage applied to this circuit to be stepped up to a value sufficient to render the contact resistances of the potentiometers and switches negligible. Moreover because of this voltage step-up and the consequent small currents in the potentiometer and associated circuits, the load imposed by these circuits is very low, thus permitting the use of a relatively small and inexpensive standard current transformer.

Various modifications may be made to the apparatus described within the scope of the invention. Thus, for example the spill winding may be divided into any number of sections, or left undivided according to the purpose for which the apparatus is to be used. The magnetic coupling device may be provided with an air core.

With transformers having a 1:1 ratio, the apparatus may be used to determine the absolute ratio and phase-angle errors.

In the claims, when reference is made to a test transformer, it is intended to mean a transformer whose characteristics are to be compared with the known characteristics of a standard transformer. The term neutralizing transformer is intended to mean a transformer in which a current resulting from a difference in potential across the test transformer creates a flux which is balanced by the flux resulting from other variable currents applied to the neutralizing transformer. Transformer 6 is such a transformer. It may be of a ring type or any other convenient type. The term load transformer is intended to mean a transformer, of an auto type or other convenient type, whose primary is connected in series with the secondaries of the standard and test transformers. Transformer 7 is such a transformer. The term spill winding is intended to mean that winding of the neutralizing transformer which is connected in parallel with the secondary of the test transformer. Winding 5 is such a spill winding.

Also in the claims, when reference is made to the resistive component of the current in the spill winding, it is intended to mean that component of the current in the spill winding which causes flux which can be neutralized by flux resulting from current in a winding in the neutralizing transformer which is primarily resistively coupled to the load transformer. The term reactive component of the current in the spill winding is intended to mean that component of the current in the spill winding which causes flux which can be neutralized by flux resulting from current in a winding in the neutralizing transformer which has a considerable reactance included in the circuit coupling said winding to the load transformer.

I claim:

1. A device for testing a test transformer, comprising a standard transformer, means for connecting the primary of said test transformer in series with a source of alternating current and the primary of said standard transformer, means for connecting the secondary of said test transformer in a series circuit with the secondary of said standard transformer, said series circuit including also the primary of a load transformer, a neutralizing transformer having a plurality of primary windings, one of the primary windings of said neutralizing transformer being a spill winding connected in parallel with said secondary of said test transformer circuit, coupling means between the secondary of said load transformer and other primary windings of said neutralizing transformer, one of said circuit coupling means including phasing means whereby its output current is in phase with the resistive component of the current in said spill winding, the other of said circuit coupling means including phasing means whereby its output current is in phase with the reactive component of the current in said spill winding, indicating means in circuit with the secondary of said neutralizing transformer.

2. A device for testing a test transformer, comprising a standard transformer, means for connecting the primary of said test transformer in series with a source of alternating current and the primary of said standard transformer, means for connecting the secondary of said test transformer in a series circuit with the secondary of said standard transformer, said series circuit including also the primary of a load transformer, a neutralizing transformer having a plurality of primary windings, one of said primary windings being a spill winding connected in parallel with the secondary of said test transformer, one of said primary windings of said neutralizing transformer being coupled by variable resistive coupling means to the secondary of said load transformer so as to carry a current in phase with the resistive component of the current in said spill winding, one of said primary windings of said neutralizing transformer being coupled by reactive and variable resistive coupling means to said secondary of said load transformer so as to carry a current in phase with the reactive component of said current in said spill winding, and current indicating means in circuit with the secondary of said neutralizing transformer.

3. A device for testing a test source of current, comprising a standard source of current of the same frequency as the current of said test source of current, means for connecting said test source of current in a series circuit with said standard source of current, said series circuit including also the primary of a load transformer, a neutralizing transformer having a plurality of primary windings, one of said primary windings being a spill winding connected in parallel with said test source of current, one of said primary windings of said neutralizing transformer being coupled by variable resistive coupling means to the secondary of said load transformer so as to carry a current in phase with the resistive component of the current in said spill winding, one of said primary windings of said neutralizing transformer being coupled by reactive and variable resistive coupling means to said secondary of said load transformer so as to carry a current in phase with the reactive component of said current in said spill winding, and current indicating means in circuit with the secondary of said neutralizing transformer.

4. A device for comparing test transformers of varying secondary current ratings with standard transformers, comprising means for connecting the primary of a test transformer having one of said secondary current ratings in series with a source of alternating current and the primary of a standard transformer having the same secondary current rating as said test transformer, a load transformer having a plurality of primary windings, switch means for connecting the secondaries of said test and standard transformers in a series circuit with one of said primary windings of said load transformer corresponding to said secondary current rating of said test and standard transformers, a neutralizing transformer having a plurality of sets of spill windings, switch means for selecting one of said sets of spill windings corresponding to said secondary current rating of said test and standard transformers, further switch means for connecting one of said windings in said selected set of spill windings in parallel with the secondary of said test transformer, a primary winding of said neutralizing transformer coupled by variable resistive coupling means to said secondary of said load transformer so as to carry a current in phase with the resistive component of the current in said connected spill winding, a primary winding of said neutralizing transformer coupled by reactive and variable resistive coupling means to the secondary of said load transformer so as to carry a current in phase with the reactive component of the current in said connected spill winding, current indicating means in circuit with the secondary of said neutralizing transformer.

5. A device as in claim 4, said associated reactive coupling means and primary winding of said neutralizing transformer being connected in series, a primary winding of said neutralizing transformer being connected in parallel with said associated reactive coupling means and primary winding.

6. A device for testing a test transformer, comprising a standard transformer, means for connecting the primary of said test transformer in series with a source of alternating current and the primary of said standard transformer, a load transformer having a plurality of primary windings, switch means for connecting the secondaries of said test and standard transformers in a series circuit with one of said primary windings of said load transformer, a neutralizing transformer having a plurality of spill windings, switch means for connecting one of said spill windings in parallel with said secondary of said test transformer, a primary winding of said neutralizing transformer coupled by variable resistive coupling means to said secondary of said load transformer so as to carry a current in phase with the resistive component of the current in said connected spill windings, a primary winding of said neutralizing transformer coupled by reactive and variable resistive coupling means to the secondary of said load transformer so as to carry a current in phase with the reactive component of said current in said connected spill winding, current indicating means in circuit with the secondary of said neutralizing transformer.

7. A device as in claim 6, said associated reactive coupling means and primary winding of said neutralizing transformer being connected in series, a primary winding of said neutralizing transformer being connected in parallel with said associated reactive coupling means and primary winding.

8. A device for testing a test transformer, comprising a standard transformer, means for connecting the primary of said test transformer in series with a source of alternating current and the primary of said standard transformer, an autotransformer, means for connecting the secondary of said test transformer in a series circuit with the secondary of said standard transformer and with the primary of said autotransformer, a neutralizing transformer comprising a plurality of windings mounted on a ferromagnetic ring, means for connecting one of said windings in parallel with the secondary of said test transformer, two potentiometers which are respectively connected in parallel with the secondary of said autotransformer, means for connecting a second neutralizing transformer winding in circuit with a fixed contact and a movable contact of the first of said potentiometers, means for connecting a third neutralizing transformer winding in circuit with a fixed contact and a movable contact of the second of said potentiometers, said last-mentioned means including a quadrature condenser which is in series with said potentiometer and said third winding, and a galvanometer which is connected in circuit with a fourth neutralizing transformer winding.

9. A claim in accordance with claim 8, in which a condenser is connected between said fixed and movable contacts of said first potentiometer, and there are means for connecting a fifth neutralizing transformer winding between said fixed and movable contacts of said second potentiometer, the magnetic fluxes induced in said ring by the voltages in said third and fifth windings opposing each other.

HERBERT STANLEY PETCH.

REFERENCES CITED

The following references are of record in the file of this patent:

UNITED STATES PATENTS

| Number | Name | Date |
| --- | --- | --- |
| 1,588,539 | Fortescue | June 15, 1926 |
| 2,210,936 | Geyger | Aug. 13, 1940 |

OTHER REFERENCES

Publication in "The Electrical Review" for October 6, 1933, titled "Current Transformer Testing" by Powell.